(12) United States Patent
Itakura et al.

(10) Patent No.: US 11,038,187 B2
(45) Date of Patent: Jun. 15, 2021

(54) PROTON CONDUCTOR AND FUEL CELL

(71) Applicants: DENSO CORPORATION, Kariya (JP); Kyoto University, Kyoto (JP)

(72) Inventors: Tomoya Itakura, Kariya (JP); Hidehiko Hiramatsu, Kariya (JP); Susumu Kitagawa, Kyoto (JP); Satoshi Horike, Kyoto (JP)

(73) Assignees: DENSO CORPORATION, Kariya (JP); Kyoto University, Kyoto (JP)

( * ) Notice: Subject to any disclaimer, the term of this patent is extended or adjusted under 35 U.S.C. 154(b) by 135 days.

(21) Appl. No.: 16/545,302

(22) Filed: Aug. 20, 2019

(65) Prior Publication Data
US 2019/0386327 A1    Dec. 19, 2019

Related U.S. Application Data

(63) Continuation of application No. PCT/JP2018/005443, filed on Feb. 16, 2018.

(30) Foreign Application Priority Data

Mar. 2, 2017   (JP) .............................. JP2017-039623

(51) Int. Cl.
*H01M 8/1041*   (2016.01)
*H01B 1/08*   (2006.01)
(Continued)

(52) U.S. Cl.
CPC ............ *H01M 8/1041* (2013.01); *H01B 1/08* (2013.01); *H01B 1/12* (2013.01); *H01M 8/02* (2013.01);
(Continued)

(58) Field of Classification Search
CPC ..... H01M 10/0565; H01M 2300/0082; H01M 2300/0088; H01M 8/02; H01M 8/103;
(Continued)

(56) References Cited

U.S. PATENT DOCUMENTS

| 6,124,060 A | 9/2000 | Akita et al. |
| 7,897,691 B2* | 3/2011 | MacKinnon ........... C08J 5/2268 525/326.2 |

(Continued)

FOREIGN PATENT DOCUMENTS

| JP | 2001-213987 A | 8/2001 |
| JP | 2003-281933 A | 10/2003 |

(Continued)

OTHER PUBLICATIONS

Ponomareva et al. "Imparting High Proton Conductivity to a Metal-Organic Framework Material by Controlled Acid Impregnation". Sep. 7, 2012, Journal of the American Chemical Society, 2012, 134, 15640-15643.

(Continued)

*Primary Examiner* — Golam Mowla
(74) *Attorney, Agent, or Firm* — Posz Law Group, PLC

(57) ABSTRACT

A proton conductor includes a complex of phosphoric acid and a coordination polymer in which a metal ion and a ligand are continuously connected by a coordinate bond. The phosphoric acid includes a first phosphoric acid that is coordinately bonded to the metal ion, and a second phosphoric acid that is not coordinately bonded to the metal ion.

7 Claims, 6 Drawing Sheets

(51) Int. Cl.
*H01B 1/12* (2006.01)
*H01M 8/02* (2016.01)
*H01M 8/103* (2016.01)
*H01M 10/0565* (2010.01)

(52) U.S. Cl.
CPC ....... *H01M 8/103* (2013.01); *H01M 10/0565* (2013.01); *H01M 2300/0082* (2013.01)

(58) Field of Classification Search
CPC ......... H01M 8/1041; H01B 1/06; H01B 1/08; H01B 1/12; Y02E 60/10; Y02E 60/50
See application file for complete search history.

(56) References Cited

U.S. PATENT DOCUMENTS

| | | | | |
|---|---|---|---|---|
| 7,897,693 | B2* | 3/2011 | MacKinnon | C08J 5/2275 |
| | | | | 525/326.2 |
| 9,178,239 | B2* | 11/2015 | Itakura | H01M 8/1067 |
| 9,929,424 | B2* | 3/2018 | Itakura | H01M 8/1046 |
| 2004/0151983 | A1* | 8/2004 | Kasuga | H01M 8/0289 |
| | | | | 429/300 |
| 2004/0151984 | A1* | 8/2004 | Goto | H01M 8/1025 |
| | | | | 429/307 |
| 2004/0214065 | A1* | 10/2004 | Kanaoka | H01M 8/1027 |
| | | | | 528/171 |
| 2005/0084727 | A1* | 4/2005 | Kiefer | H01M 8/1067 |
| | | | | 429/483 |
| 2006/0159974 | A1* | 7/2006 | Li | H01M 8/1023 |
| | | | | 429/483 |
| 2006/0165995 | A1* | 7/2006 | Im | H01M 4/606 |
| | | | | 428/408 |
| 2008/0051281 | A1* | 2/2008 | Dressick | H01M 4/8825 |
| | | | | 502/101 |
| 2009/0149623 | A1* | 6/2009 | Higami | C07D 213/65 |
| | | | | 528/125 |
| 2012/0048749 | A1* | 3/2012 | Harada | H01B 1/122 |
| | | | | 205/793 |

FOREIGN PATENT DOCUMENTS

| | | | | |
|---|---|---|---|---|
| JP | 2004-055181 A | | 2/2004 | |
| JP | 2005158646 A | * | 6/2005 | .......... H01M 8/1004 |
| JP | 2014116276 A | * | 6/2014 | .......... H01M 8/1067 |
| JP | 2017033704 A | * | 2/2017 | ............ H01B 1/122 |
| JP | 6618242 B2 | * | 12/2019 | ............ H01B 1/122 |

OTHER PUBLICATIONS

Chandra et al. "Phosphoric Acid Loaded Azo (—N=N—) Based Covalent Organic Framework for Proton Conduction". Apr. 23, 2014, Journal of the American Chemical Society, 2014, 136, 6570-6573.

* cited by examiner

PROTON CONDUCTOR AND FUEL CELL

CROSS REFERENCE TO RELATED APPLICATIONS

The present application is a continuation application of International Patent Application No. PCT/JP2018/005443 filed on Feb. 16, 2018, which designated the U.S. and claims the benefit of priority from Japanese Patent Application No. 2017-039623 filed on Mar. 2, 2017. The entire disclosures of all of the above applications are incorporated herein by reference.

TECHNICAL FIELD

The present disclosure relates to a proton conductor and a fuel cell using the same.

BACKGROUND

At present, from the viewpoint of cost reduction and system simplification of a solid polymer fuel cell system, a fuel cell that operates at an operating temperature of 100° C. or more and under a condition of no humidification is desired.

SUMMARY

The present disclosure provides a proton conductor including a complex of phosphoric acid and a coordination polymer in which a metal ion and a ligand are continuously connected by a coordinate bond. The phosphoric acid includes a first phosphoric acid that is coordinately bonded to the metal ion, and a second phosphoric acid that is not coordinately bonded to the metal ion. The proton conductor may be used as an electrolyte membrane in a fuel cell.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

In order to operate a fuel cell without humidification, a proton conductor plays an important role. Since phosphoric acid is a promising proton carrier, it is believed that a phosphoric acid-containing structure containing phosphoric acid is suitable as the proton conductor.

The phosphoric acid-containing structure may be formed by chemical bonding of phosphoric acid with other components (for example, as phosphosilicate glass, phosphate glass, metal phosphates). However, there are issues that a water resistance and an ionic conductivity are low. The phosphoric acid-containing structures may also be produced by introducing phosphoric acid into a chemically stable matrix material. Such a matrix material has pores capable of utilizing capillarity, and is promising as a material of the proton conductor.

However, in the phosphoric acid-containing structure produced by doping the phosphoric acid into the matrix material, an interaction between the pores and the phosphoric acid is small, and there is a possibility that the phosphoric acid is eluted. In addition, an effective proton conduction path is not formed and the proton conductivity is low.

According to a first aspect of the present disclosure, a proton conductor includes a complex of phosphoric acid and a coordination polymer in which a metal ion and a ligand are continuously connected by a coordinate bond. The phosphoric acid includes phosphoric acid that is coordinately bonded to the metal ion, and phosphoric acid that is not coordinately bonded to the metal ion.

According to the first aspect of the present disclosure, the ligand coordinately boned to the metal ion is partially disconnected to provide a coordination site to the metal ion, and phosphoric acid partially coordinated with the metal ion is introduced. Accordingly, a hydrogen bonding network between the phosphoric acid that is coordinately bonded to the metal ion and the phosphoric acid that is not coordinately bonded to the metal ion increases, and a proton conductivity of the proton conductor can be improved.

In addition, since the number of hydrogen bonds between the phosphoric acids introduced into the coordination polymer increases, the interaction between the phosphoric acids can be increased. As a result, elution of phosphoric acid from the coordination polymer can be restricted, and the structure of the proton conductor can be stabilized.

According to a second aspect of the present disclosure, a fuel cell includes an electrolyte membrane that is made of the proton conductor according to the first aspect.

Embodiments of the present disclosure will be described below with reference to the drawings.

A fuel cell 100 outputs an electric energy with the use of an electrochemical reaction between a fuel gas (hydrogen) and an oxidant gas (oxygen in air). The fuel cell 100 may be set as a basic unit and may be as a stack structure in which multiple layers are stacked.

Figure 1:
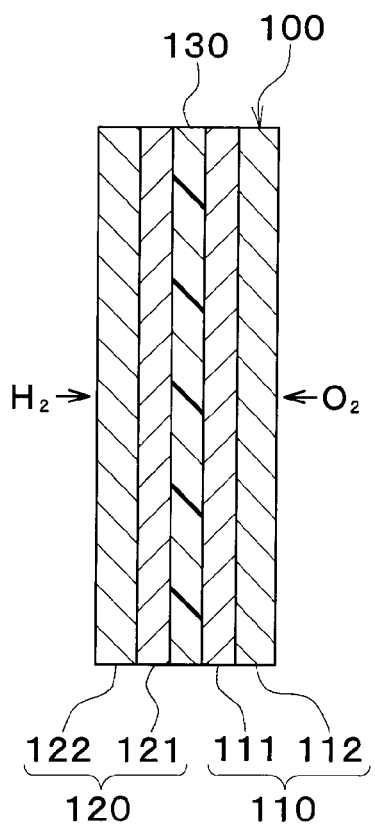
FIG. 1 is a conceptual diagram of a fuel cell according to an embodiment of the present disclosure.

As shown in FIG. 1, the fuel cell 100 includes a cathode electrode 110, an anode electrode 120, and an electrolyte membrane 130. The cathode electrode 110 is also referred to as an air electrode, and the anode electrode 120 is also referred to as a hydrogen electrode.

When a reaction gas such as hydrogen and air is supplied to the fuel cell 100, hydrogen and oxygen are electrochemically reacted to output an electric energy as will be described below.

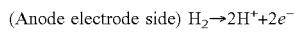
(Anode electrode side) $H_2 \rightarrow 2H^+ + 2e^-$

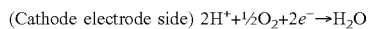
(Cathode electrode side) $2H^+ + \frac{1}{2}O_2 + 2e^- \rightarrow H_2O$ At that time, in the anode electrode 120, hydrogen is ionized into electron ($e^-$) and protons ($H^+$) by a catalytic reaction, and the protons ($H^+$) moves through the electrolyte membrane 130. On the other hand, in the cathode electrode 110, protons ($H^+$) moving from the anode electrode 120, electronics circulating from the outside, and oxygen ($O_2$) in the air react with each other to generate water.

The cathode electrode 110 includes a cathode-side catalyst layer 111 disposed in close contact with a surface of the electrolyte membrane 130 on the air electrode side, and a cathode-side diffusion layer 112 disposed outside the cathode-side catalyst layer 111.

The anode electrode 120 includes an anode-side catalyst layer 121 disposed in close contact with a surface of the electrolyte membrane 130 on the hydrogen electrode side, and an anode-side diffusion layer 122 disposed outside the anode-side catalyst layer 121.

Each of the catalyst layers 111 and 121 is formed of, for example, a carbon-supported platinum catalyst on which a catalyst (for example, platinum) for promoting an electrochemical reaction is supported on a carbon support, and each of the diffusion layers 112 and 122 is formed of, for example, a carbon cloth.

The electrolyte membrane 130 is made of a proton conductor containing metal ions, ligands, and phosphoric acid. The proton conductor is a complex of phosphoric acid and a coordination polymer in which a metal ion and a ligand are continuously connected by a coordinate bond.

The metal ion included in the proton conductor is not particularly limited, but a metal ion of a trivalent transition metal (for example, V, Cr, Mn, Fe, Co, or Ni) is preferable from the viewpoint of structural stability when phosphoric acid is introduced into the coordination polymer. In other words, it is preferable that a metal in the metal ion is at least one selected from the group consisting of V, Cr, Mn, Fe, Co, and Ni.

The ligand is an organic compound having two or more carboxyl groups (—COOH) or phosphonic acid groups (—PO(OH)$_2$) as a portion coordinately bonded to the metal ion. Specifically, for example, oxalic acid, acetylene dicarboxylic acid, fumaric acid, terephthalic acid, trimesic acid, pyromellitic acid, 1,4-dicarboxynaphthalene, and 2,6-dicarboxynaphthalene can be suitably used as the basic skeleton of the ligand. The basic skeleton of the ligand may have a functional group such as an amino group, a carboxyl group, a phosphonic group, or a sulfone group which does not participate in a coordinate bond.

In other words, it is preferable that the ligand is at least one selected from the group consisting of oxalic acid, acetylene dicarboxylic acid, fumaric acid, terephthalic acid, trimesic acid, pyromellitic acid, 1,4-dicarboxynaphthalene, and 2,6-dicarboxynaphthalene.

As a coordination polymer in which Cr and terephthalic acid are coordinated, Cr-MIL-101 (composition formula: $Cr_3OF(H_2O)_2(C_8H_4O_4)_3$) or Cr-MIL-53 (composition formula: $Cr(OH)(C_8H_4O_4)$) can be exemplified. As a coordination polymer in which Fe and trimesic acid are coordinated and bonded, Fe-MIL-100 (composition formula: $(Fe_3O(OH)(H_2O)_2(C_9H_3O_6)_2)$) can be exemplified.

Figure 2:
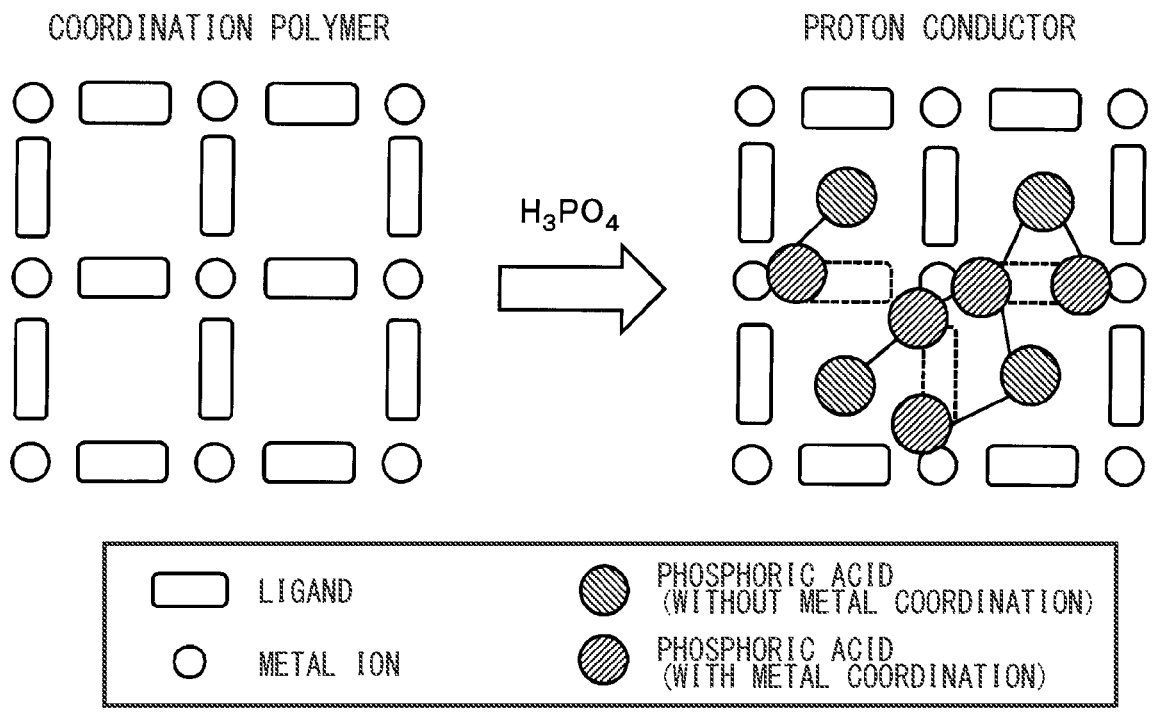
FIG. 2 is a diagram showing a basic configuration of a proton conductor.

FIG. 2 shows a basic configuration of the proton conductor according to the present embodiment. In the present embodiment, the coordination polymer in which the metal ion and the ligand are continuously connected by the coordinate bond is generated, and the proton conductor is generated by introducing phosphoric acid into the coordination polymer.

The coordination polymer in which the metal ion and the ligand are continuously connected by the coordinate bond can be obtained, for example, by hydrothermal synthesis.

The coordination polymer is a porous body, and is configured as a metal-organic composite (MOF) having a large number of pores inside. The proton conductor of the present embodiment can be obtained by introducing phosphoric acid into the coordination polymer. For example, phosphoric acid can be introduced into the coordination polymer by mixing the coordination polymer and phosphoric acid at atmospheric pressure.

In the present embodiment, the phosphoric acid introduced into the coordination polymer is high concentration and is excessive with respect to the metal element (for example, Cr or Fe) included in the coordination polymer. For example, it is desirable to introduce phosphoric acid having a concentration of about 85% into the coordination polymer in an amount of 4 to 5 equivalents with respect to the metal element included in the coordination polymer.

As described above, the phosphoric acid is introduced at a high concentration and excessively into the coordination polymer, so that the generated proton conductor is in a state in which the coordinate bond between the ligand and the metal ion configuring the coordination polymer is partly disconnected. In the proton conductor shown on a right side of FIG. 2, a portion indicated by dashed lines indicate a portion where the coordinate bond between the ligand and the metal ion is disconnected.

In the portion where the coordinate bond between the ligand and the metal ion is disconnected, a part of the phosphoric acid is coordinately bonded to the metal ion. In other words, the phosphoric acid configuring the proton conductor includes phosphoric acid coordinately bonded to the metal ion and phosphoric acid not coordinately bonded to the metal ion. The phosphoric acid that is coordinately bonded to the metal ion and the phosphoric acid that is not coordinately bonded to the metal ion are bonded by hydrogen bonding.

In the present disclosure, a case of being simply referred to as "phosphoric acid" indicates the entire phosphoric acid configuring the proton conductor, and is intended to include the phosphoric acid coordinately bonded to the metal ion and the phosphoric acid that is not coordinately bonded to the metal ion.

According to the proton conductor of the present embodiment described above, the ligand coordinately bonded to the metal ion is partially disconnected to provide a coordination site to the metal ion, and the phosphoric acid partially coordinated with the metal ion is introduced. Accordingly, a hydrogen bonding network between the phosphoric acid coordinately bonded to the metal ion and the phosphoric acid not coordinately bonded to the metal ion is increased, and a proton conductivity of the proton conductor can be improved.

In addition, since the number of hydrogen bonds between the phosphoric acids introduced into the coordination polymer increases, an interaction between the phosphoric acids can be increased. As a result, elution of phosphoric acid from the coordination polymer can be restricted, and the structure of the proton conductor can be stabilized.

First Example

Next, a first example of the present disclosure will be described. An ion conductor of the first example uses a Cr ion as a metal ion and terephthalic acid as a ligand.

First, chromium nitrate nonahydrate, terephthalic acid, and hydrofluoric acid were put in an autoclave, and hydrothermal synthesis was performed using water as a solvent. Hydrothermal synthesis was carried out at 220° C. for 6 hours.

Next, the product obtained by hydrothermal synthesis was filtered to collect a solid, washed with ethanol, and dried at 80° C. As a result, a coordination polymer Cr-MIL-101 in powder form was obtained.

Cr-MIL-101 and 85% phosphoric acid were then added to a mortar and mixed in air for 10 minutes. The amount of phosphoric acid was 5 equivalents with respect to Cr included in Cr-MIL-101. After mixing, vacuum drying was performed at 150° C. for 3 hours. As a result, a solid material of the proton conductor was obtained.

Figure 3:
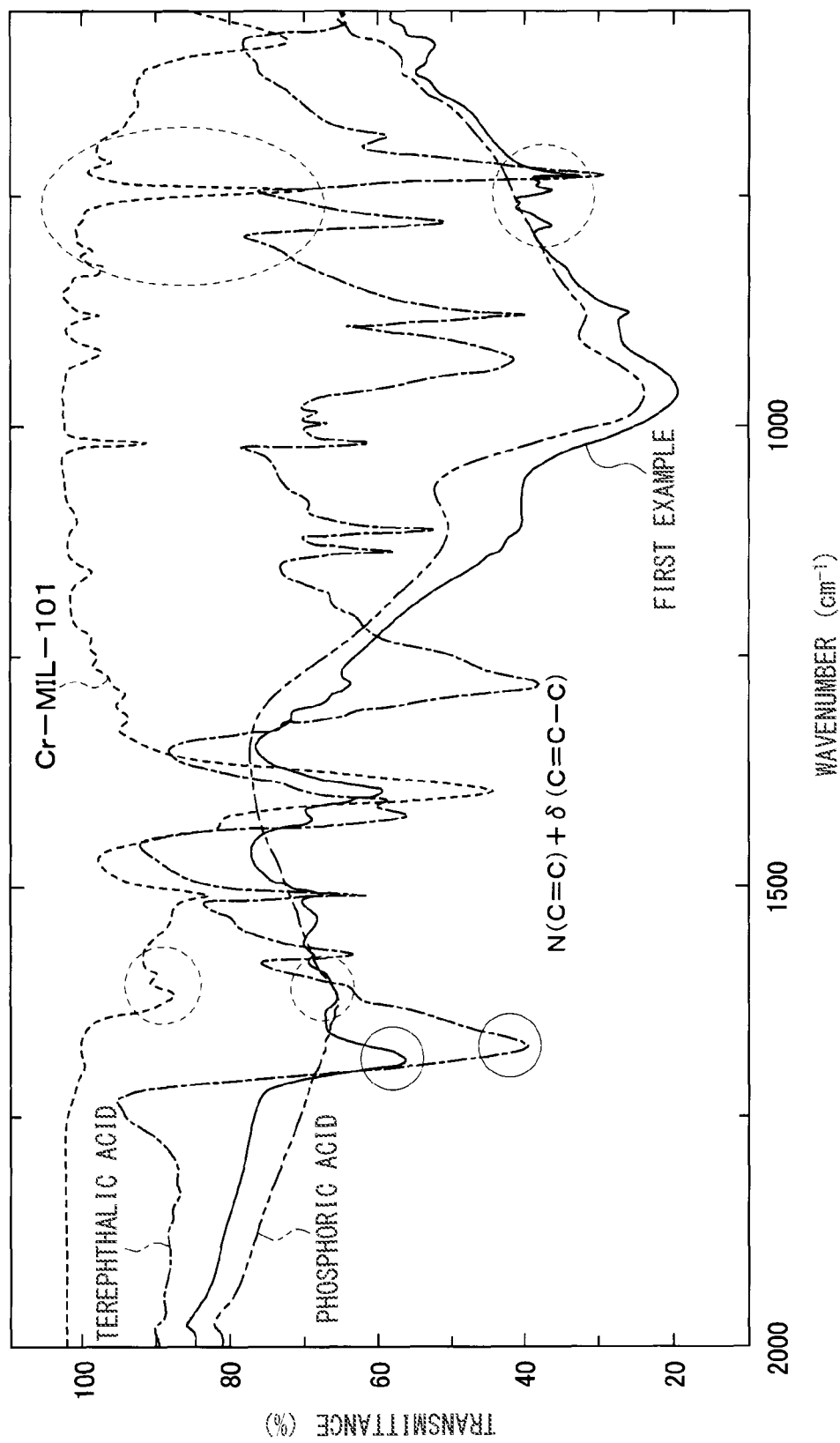
FIG. 3 is a diagram showing a result of analyzing a proton conductor according to a first example by infrared absorption spectroscopy (IR)

Next, the result of analysis of the molecular structure of the proton conductor produced in the first example by infrared absorption spectroscopy (IR) will be described with reference to FIG. 3. FIG. 3 shows spectra of the proton conductor according to the first example, Cr-MIL-101, phosphoric acid, and terephthalic acid.

As shown in the circled portion of the solid line in FIG. 3, the spectrum of the proton conductor of the first example has a peak approximating to a peak showing a carboxyl group which is not coordinated and included in terephthalic acid. Thus, the proton conductor of the first example has a carboxyl group which is not coordinated. In addition, as shown in the circled part of a dashed line in FIG. 3, the IR spectrum of the proton conductor according to the first example has a peak approximate to a peak indicating a carboxyl group having a coordinate bond included in Cr-MIL-101. Thus, the proton conductor of the first example has a carboxyl group which is coordinated.

From the above viewpoint, it can be confirmed that the proton conductor of the first example has a carboxyl group which is coordinately bonded and a carboxyl group which is not coordinately bonded. In other words, in the proton conductor of the first example, a part of the coordinate bond between the carboxyl group and Cr is disconnected.

Figure 4:
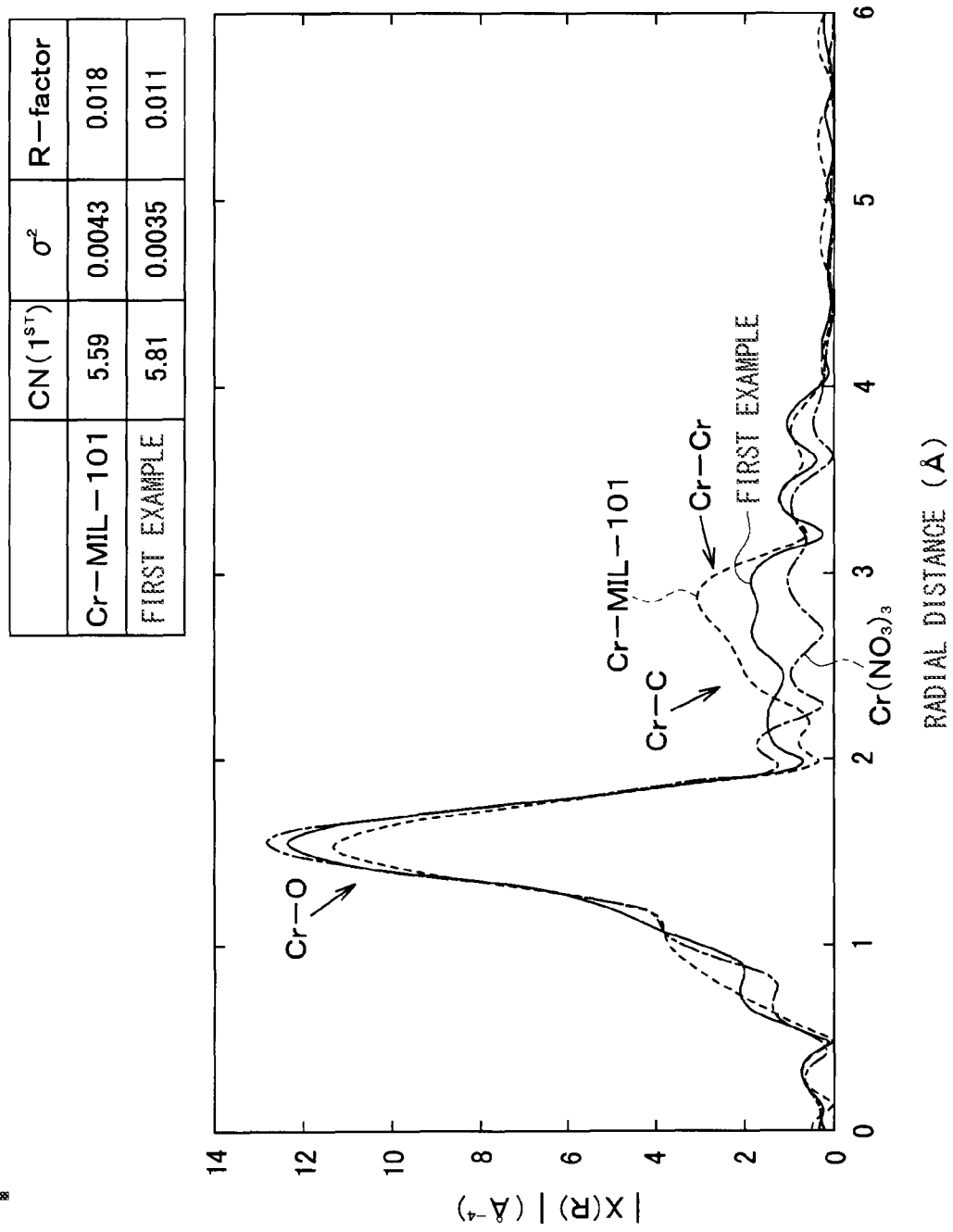
FIG. 4 is a diagram showing a result of analyzing the proton conductor according to the first example by X-ray absorption fine structure analysis (XAFS)

Next, the result of analysis of the molecular structure of the proton conductor produced in the first example by X-ray absorption fine structure analysis (XAFS) will be described with reference to FIG. 4. FIG. 4 shows spectra of the proton conductor according to the first example, Cr-MIL-101, and $Cr(NO_3)_3 \cdot 9H_2O$. The spectrum shown in FIG. 4 shows coordinate bonds between Cr and other elements.

CN (1st) in a table of FIG. 4 indicates the number of O elements coordinated with Cr. As shown in FIG. 4, while the number of O elements coordinated with Cr is 5.59 in Cr-MIL-101, the number of O elements coordinated with Cr is 5.81 in the protonic conductor according to the first example.

As described above, in the proton conductor according to the first example, the coordinate bond of the carboxyl group of terephthalic acid and Cr is partially disconnected. As shown in FIG. 4, in the proton conductor according to the first example, the number of O elements coordinated with Cr is about the same as the number of O elements coordinated with Cr in Cr-MIL-101 where the coordinate bond between the O element of terephthalic acid and Cr is not disconnected.

Thus, in the proton conductor according to the first example, it is considered that Cr is coordinately bonded to O element other than the O elements of terephthalic acid. Specifically, in the proton conductor according to the first example, it is considered that Cr whose coordinate bond with terephthalic acid is disconnected is coordinated with the O element of phosphoric acid.

Figure 5:
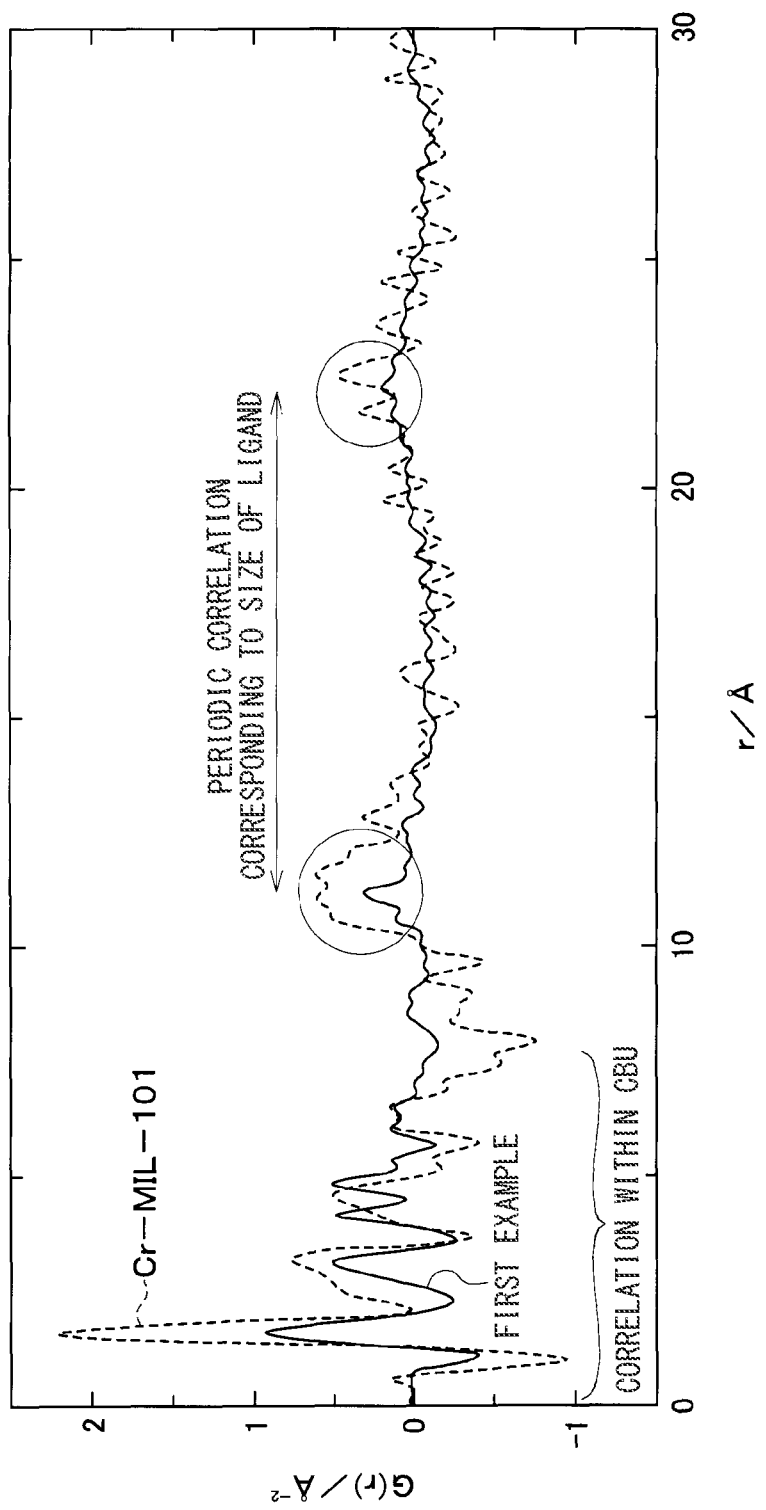
FIG. 5 is a diagram showing a result of analyzing the proton conductor according to the first example by X-ray scattering.

Next, the molecular structure of the proton conductor produced according to the first example is analyzed by X-ray scattering, and the result will be described with reference to FIG. 5. FIG. 5 shows spectra of the proton conductor according to the first example and Cr-MIL-101. A vertical axis of FIG. 5 is a reduced two-body distribution function obtained by Fourier-transform of X-ray scattering, and shows the probability that atoms exist at a position of a distance r.

In Cr-MIL-101, a size of the Cr-centered structural units CBU (Cluster Building Unit) is about 6 to 7 Å (0.6 nm to 0.7 nm). The proton conductors of the first example have smaller peaks compared to Cr-MIL-101, but remain correlated within CBUs.

In addition, although the proton conductor of the first example has the smaller peaks as compared with Cr-MIL-101, the proton conductor also remains periodically correlated with the size of terephthalic acid, which is the ligand.

From the above viewpoint, it is confirmed that a backbone of the coordination polymer (Cr-MIL-101) partially remains in the proton conductor of the first example.

Figure 6:
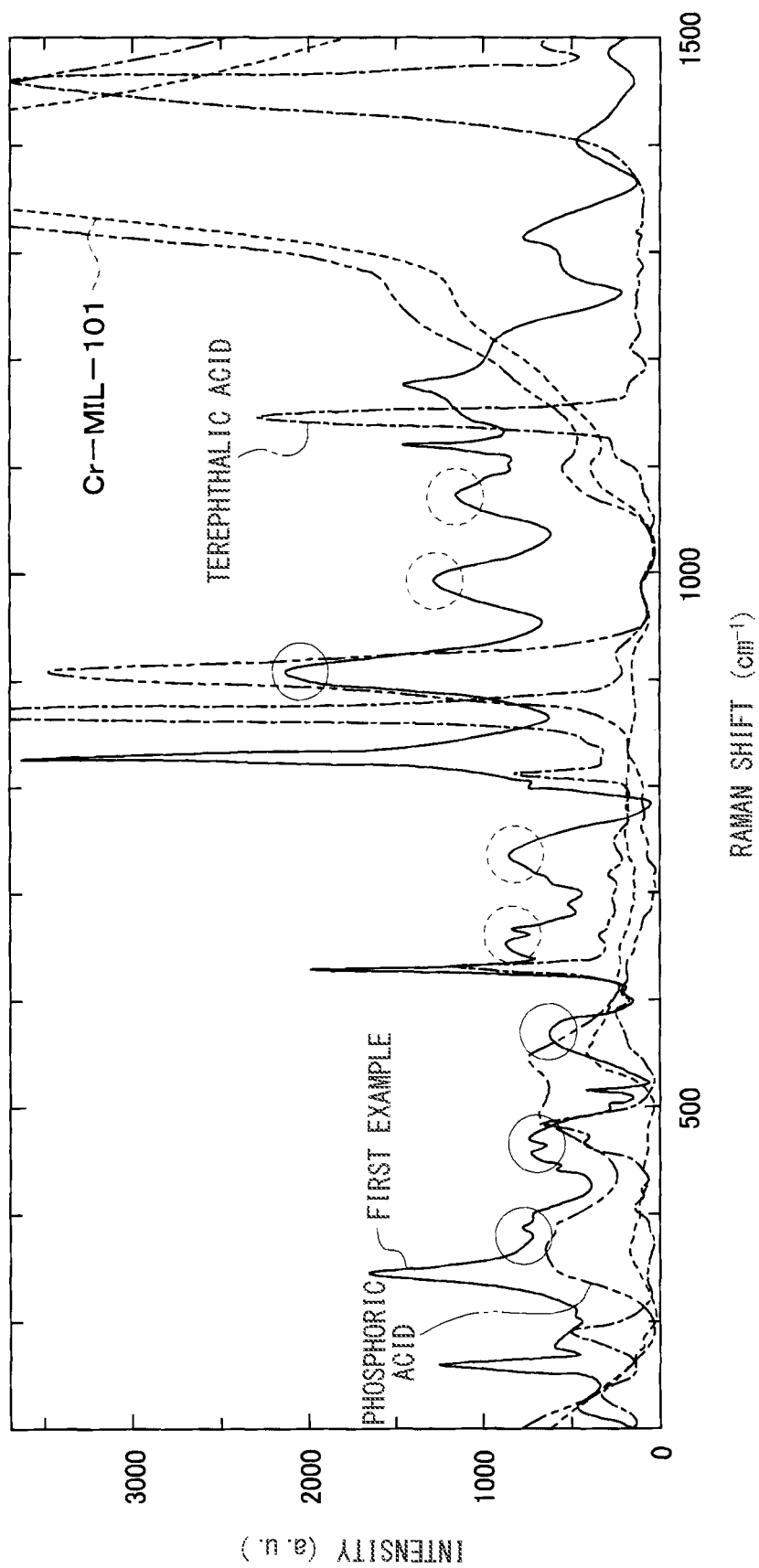
FIG. 6 is a diagram showing a result of analyzing the proton conductor according to the first example by Raman spectroscopy.

Next, the molecular structure of the proton conductor produced in the first example is analyzed by Raman spectroscopy, and the result will be described with reference to FIG. 6. FIG. 6 shows spectra of the proton conductor according to the first example, Cr-MIL-101, terephthalic acid, and phosphoric acid.

As shown by solid line circles in FIG. 6, the proton conductor according to the first example exhibits peaks indicating phosphoric acid which is not coordinated. Further, as indicated by dashed line circles in FIG. 6, peaks showing phosphoric acid which is coordinated appear in the proton conductor according to the first example. In other words, it can be confirmed that the proton conductor according to the first example includes phosphoric acid which is not coordinately bonded to Cr and phosphoric acid which is coordinately bonded to Cr.

From the above-described analysis results of FIGS. 3 to 6, it can be confirmed that the proton conductor produced in the first example has a basic structure of a coordination polymer, and includes phosphoric acid coordinately bonded to Cr and phosphoric acid not coordinately bonded to Cr.

Second and Third Examples

Next, second and third examples according to the present disclosure will be described. Ion conductors of the second and third examples use a Cr ion as a metal ion and terephthalic acid as a ligand.

First, chromium nitrate nonahydrate, terephthalic acid, and hydrofluoric acid were put in an autoclave, and hydrothermal synthesis was performed using water as a solvent. Hydrothermal synthesis was performed at 220° C. for 3 days.

Next, a product obtained by hydrothermal synthesis was filtered to collect a solid, and the solid was dissolved in dimethylformamide (DMF) as a solvent, followed by thermal treatment at 150° C. for 20 hours.

The solid was then collected from the product obtained by thermal treatment and dried at 250° C. for 1 hour. As a result, a coordination polymer Cr-MIL-53 in powder form was obtained.

Cr-MIL-53 and 85% phosphoric acid are then added to a mortar and mixed in air for 10 minutes. In the second example, the amount of phosphoric acid was 4 equivalents to Cr included in Cr-MIL-53, and in the third example, the amount of phosphoric acid was 5 equivalents to Cr included in Cr-MIL-53. After mixing, vacuum drying was performed at 150° C. for 3 hours. As a result, a solid material of the proton conductor was obtained.

Fourth Example

Next, a fourth example of the present disclosure will be described. An ion conductor of the fourth example uses a Fe ion as a metal ion and trimesic acid as a ligand.

First, iron (III) chloride hexahydrate and trimesic acid were placed in a pressure-resistant glass tube for microwave synthesis, and microwave synthesis was performed with the use of water as a solvent. Microwave synthesis was performed at 130° C. for 5 minutes and 30 seconds.

Next, a product obtained by the microwave synthesis was collected as a powder by centrifugation, and the powder was washed with water, heated at 80° C. and dried. As a result, a coordination polymer Fe-MIL-100 in powder form was obtained.

Fe-MIL-100 and 85% phosphoric acid were then added to a mortar and mixed in air for 10 minutes. The amount of phosphoric acid was 4 equivalents of Fe included in Fe-MIL-100. After mixing, vacuum drying was performed at 150° C. for 3 hours. As a result, a solid material of the proton conductor was obtained.

First to Fourth Comparative Examples

Next, first to fourth comparative examples will be described. Ion conductors of the first to fourth comparative examples use a Cr ion as a metal ion and terephthalic acid as a ligand. The first to fourth comparative examples differ from the second and third examples in the amount of phosphoric acid added to Cr-MIL-53.

In the first comparative example, the amount of phosphoric acid was 1 equivalent to Cr included in Cr-MIL-53. In the second comparative example, the amount of phosphoric acid was 2 equivalent to Cr included in Cr-MIL-53. In the third comparative example, the amount of phosphoric acid was 3 equivalent to Cr included in Cr-MIL-53. In the fourth comparative example, the amount of phosphoric acid was 6 equivalent to Cr included in Cr-MIL-53.

In the first to third comparative examples (1 to 3 equivalents), solid materials were obtained. In contrast, in the fourth comparative example (6 equivalents), the product was in a paste state, and a solid material could not be obtained.

Fifth Comparative Example

Next, a fifth comparative example will be described. An ion conductor of the fifth comparative example uses a Cr ion as a metal ion and terephthalic acid as a ligand.

In the fifth comparative example, an attempt was made to simultaneously form a coordination polymer and introduce phosphoric acid.

First, chromium nitrate nonahydrate, terephthalic acid, 85% phosphoric acid were added to a mortar and mixed in the atmosphere for 10 minutes. The amount of phosphoric acid was 5 equivalents of Cr included in chromium nitrate nonahydrate. After mixing, vacuum drying was performed at 150° C. for 3 hours.

In the fifth comparative example, the product was in a paste state, and a solid could not be obtained.

Ionic Conductivity of Examples and Comparative Examples

Next, the ionic conductivity of the proton conductors produced in each example and each comparative example will be described with reference to FIG. 7. The ionic conductivity was measured for the first to fourth examples and the first to third comparative examples in which solid materials were obtained.

Figure 7:
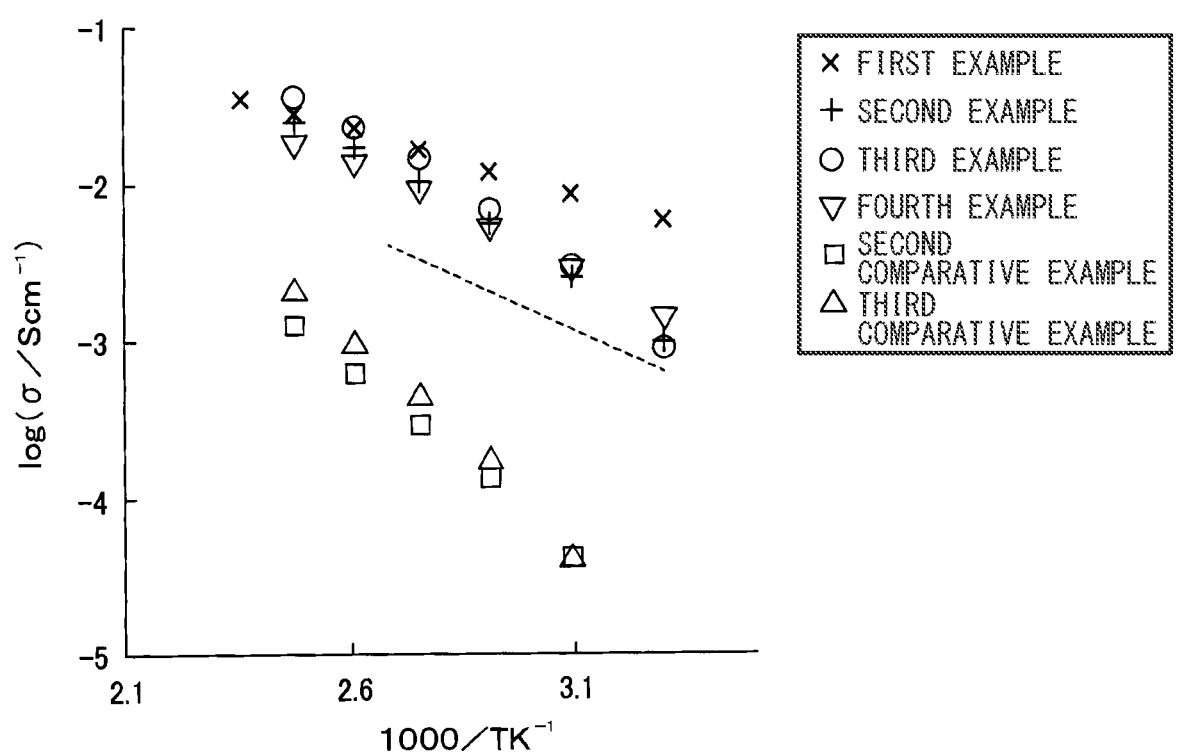
FIG. 7 is a graph showing ionic conductivities of proton conductors produced in examples and comparative examples.

In FIG. 7, as a related art, an ionic conductivity of a proton conductor disclosed in J. Am. Chem. Soc., 2012, 134 (38), pp 15610-15643 is indicated by a dashed line. The horizontal axis of FIG. 7 represents the reciprocal of the absolute temperature.

As shown in FIG. 7, the ionic conductivity of each proton conductor produced in the first to fourth examples exceeds the ionic conductivity of the related art. The variation of the ionic conductivity with respect to the temperature change is different in each example, and the proton conductor of the first example has the smallest variation of the ionic conductivity with respect to the temperature change.

The proton conductors produced in the second comparative example and the third comparative example have ionic conductivities lower than that of the related art. The ionic conductivity of the proton conductor produced in the first comparative example is $10^{-8}$ S/cm or less and is not shown in FIG. 7.

Other Embodiments

The present disclosure is not limited to the embodiments described above, and various modifications can be made as follows within a range not departing from the spirit of the present disclosure. The means disclosed in each of the above embodiments may be appropriately combined to the extent practicable.

For example, in the above embodiments, an example in which the proton conductor of the present disclosure is applied as the electrolyte membrane 130 of the fuel cell 100 has been described, but the proton conductor of the present disclosure is not limited to the above example, and may be used for applications other than fuel cell such as a steam electrolysis and a hydrogen separation membrane.

What is claimed is:

1. A proton conductor comprising: a complex of phosphoric acid and a coordination polymer in which a metal ion and a ligand are continuously connected by a coordinate bond, wherein the phosphoric acid includes a first phosphoric acid that is coordinately bonded to the metal ion, and a second phosphoric acid that is not coordinately bonded to the metal ion.

2. The proton conductor according to claim 1, wherein a metal in the metal ion is a trivalent transition metal.

3. The proton conductor according to claim 2, wherein the metal in the metal ion is at least one selected from the group consisting of V, Cr, Mn, Fe, Co, and Ni.

4. The proton conductor according to claim 1, wherein the ligand has two or more carboxyl groups or phosphonic acid groups as a portion that is coordinately bonded to the metal ion.

5. The proton conductor according to claim 4, wherein the ligands is at least one selected from the group consisting of oxalic acid, acetylene dicarboxylic acid, fumaric acid, terephthalic acid, trimesic acid, pyromellitic acid, 1,4-dicarboxynaphthalene, and 2,6-dicarboxynaphthalene.

6. The proton conductor according to claim 1, wherein the complex includes 4 to 5 equivalents of the phosphoric acid relative to the metal ion.

7. A fuel cell comprising: an electrolyte membrane that is made of a proton conductor including a complex of phosphoric acid and a coordination polymer in which a metal ion and a ligand are continuously connected by a coordinate bond, wherein the phosphoric acid includes a first phosphoric acid that is coordinately bonded to the metal ion, and a second phosphoric acid that is not coordinately bonded to the metal ion.

\* \* \* \* \*